United States Patent
Bantug

(10) Patent No.: US 11,431,859 B1
(45) Date of Patent: Aug. 30, 2022

(54) TOUCHLESS MODE FOR OPERATION OF A DOCUMENT PROCESSING DEVICE

(71) Applicant: KYOCERA Document Solutions Inc., Osaka (JP)

(72) Inventor: Klyve-Orsy Ortiz Bantug, La Mirada, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/367,218

(22) Filed: Jul. 2, 2021

(51) Int. Cl.
*G06F 15/00* (2006.01)
*H04N 1/00* (2006.01)

(52) U.S. Cl.
CPC ..... *H04N 1/00395* (2013.01); *H04N 1/00281* (2013.01); *H04N 1/00411* (2013.01); *H04N 1/00413* (2013.01)

(58) Field of Classification Search
CPC .......... H04N 1/00395; H04N 1/00281; H04N 1/00411; H04N 1/00413
USPC ....................................... 358/1.13
See application file for complete search history.

(56) References Cited

U.S. PATENT DOCUMENTS

| | | | |
|---|---|---|---|
| 11,252,285 B1 * | 2/2022 | Ullmann | ............ H04N 1/00413 |
| 2004/0169727 A1 * | 9/2004 | Romano | ............ H04N 1/00148 |
| | | | 348/207.2 |
| 2016/0352946 A1 | 12/2016 | Eguchi | |

OTHER PUBLICATIONS

Command Center RX User Guide, copyright 2017, Kyocera Document Solutions Inc., pp. 10-17.

* cited by examiner

*Primary Examiner* — Mark R Milia
(74) *Attorney, Agent, or Firm* — W. Eric Webostad

(57) ABSTRACT

Systems and methods relate generally to a document processing device. In an example method thereof, a document processing device is provided having a touch screen panel and configurable for touchless execution of a job. The job is performed with the document processing device with the touchless execution. The touchless execution includes: accessing a slide presentation mode; displaying a sequence of slides on the touch screen panel in the slide presentation mode; detecting paper accessible by a detection sensor of the document processing device; stopping at a slide of the sequence of slides responsive to a detection event of the detection sensor; pausing at the slide responsive to the detection event; and executing the job with the touchless execution responsive to persistence of the detection event by the detection sensor for a set duration during the pause.

20 Claims, 9 Drawing Sheets

TOUCHLESS MODE FOR OPERATION OF A DOCUMENT PROCESSING DEVICE

FIELD

The following description relates to a document processing device. More particularly, the following description relates to a touchless mode for a document processing device.

BACKGROUND

Conventionally, in office and production printers, features and/or settings are input via a touch screen. However, in a pandemic or other context where contact with a printer may be a vector for spread of a contagion, use of such a printer may be limited.

SUMMARY

In accordance with one or more below described examples, a method relating generally to operation of a document processing device is disclosed. In such a method, a document processing device is provided having a touch screen panel and configurable for touchless execution of a job. The job is performed with the document processing device with the touchless execution. The touchless execution includes: accessing a slide presentation mode; displaying a sequence of slides on the touch screen panel in the slide presentation mode; detecting paper accessible by a detection sensor of the document processing device; stopping at a slide of the sequence of slides responsive to a detection event of the detection sensor; pausing at the slide responsive to the detection event; and executing the job with the touchless execution responsive to persistence of the detection event by the detection sensor for a set duration during the pause.

In accordance with one or more below described examples, a system relating generally to a document processing device is disclosed. In such a system, such a document processing device has a touch screen panel and is configurable for touchless execution of a job. The document processing device is configured to perform the job with the touchless execution. The touchless execution includes: a slide presentation mode configured to access a sequence of slides for display thereof on the touch screen panel; and a detection sensor configured to detect paper accessible by the document processing device. The document processing device is configured to: stop at a slide of the sequence of slides responsive to a detection event of the detection sensor; pause at the slide responsive to the detection event; and execute the job with the touchless execution responsive to persistence of the detection event by the detection sensor for a set duration during the pause.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a flow diagram depicting another example of a document processing system flow.

FIG. 2-1 is a block diagram depicting an example of a document processing system.

FIG. 2-2 is a pictorial diagram depicting an example of a panel.

FIGS. 3-1 through 3-3 are respective pictorial diagrams depicting examples of screen displays of a user interface.

FIG. 3-4 is a block-flow diagram depicting examples of a sequence of slides of a slide show.

FIG. 4 is a pictorial diagram depicting an example of a network.

DETAILED DESCRIPTION

Figure 1:
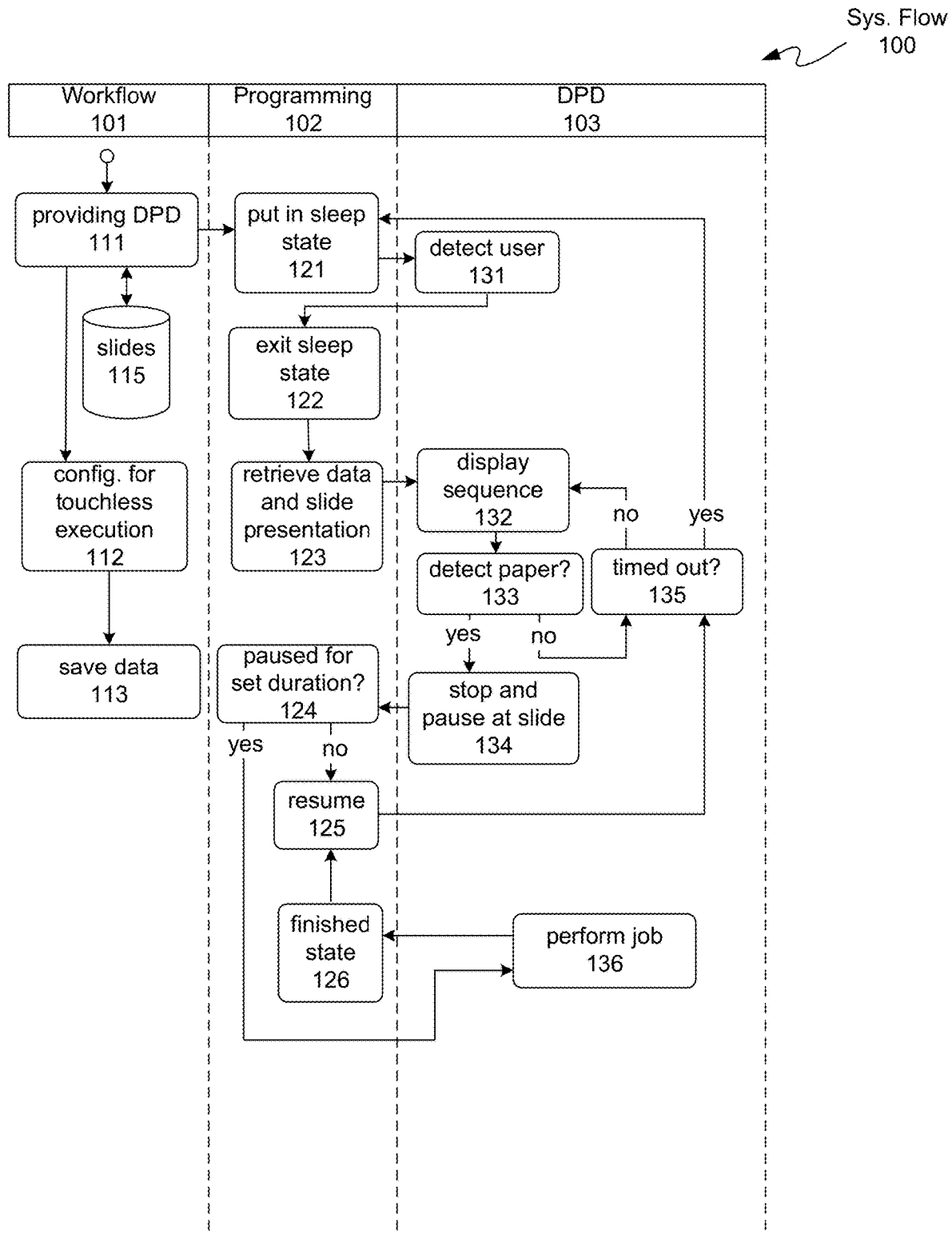
FIG. 1-1 is a flow diagram depicting an example of a document processing system flow.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Generally, in office and production printers, users and/or administrators may set "configurations" that can take effect during use of a device, whether for printing, job storage, scanning, or other function of a printing device. For example, there can be: session-specific configuration (i.e., per printing job for example); default configuration, which takes effect each launch of a printer driver for an associated printing device; or default configuration a single user or all users of a computer system.

Users or administrators may be able see or access all features and/or settings in a user interface of a printing device. Users may select specific setting for each feature, such as for example page media size, color mode, duplex mode, and/or other features. Generally, a printing device "feature" is configurable. Examples of printing device features may include one or more of "PageMediaSize," "Color Mode," "Duplex," "Stapling," or "PunchHole," among others. Generally, a printing device setting is a selected value or state for an associated or corresponding feature, such as for example "A4" or "Letter" for Page Media Size, or duplex for "Duplex", or "On" for PunchHole. Along those lines, features may be paired or otherwise associated with one or more corresponding settings (hereinafter "pairings" for purposes of clarity and not limitation). A set or list of such pairings may identify a configuration of a printing device for either a print session or job or as a default configuration, with the latter being for feature-setting pairings saved as default configuration.

Furthermore, there may be device dependent configurations. For example, office and production printers may be capable of including finishing devices or units. Finishing devices or units can be attached to a main printing device or unit and can be detected by such main printing unit. When a finishing device is detached, such a finishing device or unit may be detected as not being installed. Depending on whether a finishing device or unit is installed (attached) or not (detached), a feature associated with it may be reflected in a user interface of a printing device. For example, a booklet finisher may be attached or detached from a printing device, and if installed, booklet finishing settings may be in a printer driver and shown in a printer front panel, a printer's web management page, and/or a mobile application in communication with such a printing device. When a finishing unit or other optional device is detached from a printing device, associated features and/or setting may either be hidden or disabled (grayed-out). In another example, an entire feature may be hidden or disabled. Other finishing features such as stapling units, punch hole units, folding units, and/or stitching units, among others.

Generally, features and/or settings are pre-determined. Once available, such features and/or settings are visible and available for use. Generally, some features and/or settings may only appear or disappear depending on the presence or not of a hardware component, such as in the above example with reference to a finishing device. If a finishing device is attached for a day, week or month, corresponding features and/or settings may be visible in a user interface or device panel for the same period.

In an office environment or production printing shop, there can be a desire to conserve resources such as ink, electricity, and/or supplies for finishing devices, such as staples or glue, to name a few. Additionally, there can be schedules or times to hide or show certain features or settings, such as color mode, media types, paper sizes, printing quality, and/or other flexible usage contexts. While there can be power and ink saving modes for example, generally features and/or settings are available in a user interface for any permitted user with no time constraint on usage of features and/or settings.

Along those lines there may a set of configuration used by users in such environment. As described below in additional detail, these configurations can be represented as slides. Having such slides in a slide presentation, a user may cause a job to be performed without having to physically directly touch a document processing device, such as a form of printing device for example.

With the above general understanding borne in mind, various configurations for dynamic scheduling, and methods therefor, for printing devices are described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1-1 is a flow diagram depicting an example of a document processing system flow 100. Document processing flow 100 may include a workflow 101, programming 102, and a document processing device ("DPD") 103. In this example for purposes of clarity and not limitation programming 102 is instantiated as firmware 102, such as in solid-state memory for example, of a DPD 103. However, in another example, an app, a driver, or other programming may be used, which may be instantiated in another form of memory or storage, as described elsewhere herein. For purposes of clarity by way of example, DPD 103 is described below as a multi-function printer ("MFP") 103. However, in another example, a DPD may be a scanner, a copier, a printer, or other document processing device.

Workflow 101 may include operations 111 through 113. At operation 101, a DPD, such as an MFP as described elsewhere herein, may be obtained or provided. Such an MFP may have a touch screen panel and may be configured for touchless execution of a job. For purposes of clarity by way of example and not limitation, it shall be assumed that such a job is a copy job. However, in another example, such a job may be a scanning job, a copying job, or other document processing job.

An MFP provided at operation 111 may have access to read and write to storage 115 slides, as described below in additional detail. At operation 112, such an MFP may be configured for touchless execution. Along those lines, an MFP may have firmware 102 configured for touchless execution, where such touchless execution programming includes a default configuration. However, data, such as parametric data or user selectable data as described below in additional detail, may be used to depart from such default configuration. Along those lines, at operation 112 a user, using a user interface of or to such programming 102, may input and/or select such parametric data or user selectable data for configuration of an MFP at operation 112. At operation 113, such data input at 112 may be saved.

In an example, system and administrative settings programming of an MFP 103 may be used to set up such an MFP for touchless execution of a copy job. In this example, such set up may be via a host device in network communication with MFP 103. Along those lines, an app or a printer driver may be used to access system and administrative settings programming. Such app or driver may be considered part of programming 102

Operations 131 through 136 may be operation of an MFP 103. At operation 136, a job, such as a copy job, may be performed with MFP 103 using touchless execution. By "touchless execution", it is generally meant a human does not need to physically touch, such as a touch screen panel, of an MFP 103 to perform a job at such MFP.

However, prior to performing a copy job at operation 136, other operations may be performed as described hereinbelow.

Operations 121 through 126 may be performed by firmware 102. However, one or more of operations performed by firmware 102 of an MFP 103 may be considered MFP operations in this example. However, in another example, one or more of operations 121 through 126 may be performed external to an MFP 103, such as by a driver or app controlling one or more of operations of an MFP 103.

At operation 121, an MFP 103 may be put in a sleep state, such as due to inactivity for example, by firmware 102. At operation 131, an MFP 103 having one or more user detection sensors may detect presence of a user. A user sensor or user detection sensor may be selected from a radio frequency identification reader, a Bluetooth sensor, or a near-field communication sensor. Along those lines, a user may carry a user card, a mobile phone, or other device configured for being sensed by a user detection sensor. In another example, rather than an active detection system which may be used to obtain user identification by sensor reporting or reading, a passive identification system may be used. For example, a user sensor or a user detection sensor in another example may be selected from a motion detection sensor, a thermal detection sensor, or a visual image sensor, such as a camera in communication with a facial recognition application.

At operation 122 MFP 103 may exit a sleep state by firmware 102 responsive to detection of a user by a user sensor of or in communication with MFP 103. If a user is detected by a user detection sensor of MFP 103 at operation 131, a signal may be asserted to firmware 102 to exit a sleep state at operation 122. After exiting a sleep state or otherwise in an operational state, at operation 123 firmware 102 may enter or access a slice presentation mode at operation 123.

At operation 123 in response to accessing a slide presentation mode, firmware 102 may retrieve data, such as data save at operation 113, and retrieve a slide presentation, such as from storage 115.

At operation 132, MFP 103 may display, such as on a touch screen panel, a sequence of slides of such slide presentation retrieved in a slide presentation mode. Slides may be displayed, such as in a sequence, one slide at a time with each slide displayed for a preset duration before displaying a next slide in a sequence.

At operation 133, MFP 103 may detect paper accessible by a detection sensor of MFP 103. If paper is not detected at operation 133, at operation 135 it may be determined whether displaying a sequence of slides at operation 132 has timed out. For example, a sequence of slides may be displayed at most a fixed number of cycles, such as 1, 2, or 3 cycles for example, before timing out. If it is determined at operation 135 that displaying a sequence of slides has timed out, then MPF 103 may be put into a sleep state at operation 121 by firmware 102. If, however, it is determined at operation 135 that a sequence of slides being displayed has not timed out, then such displaying may continue at operation 132.

Responsive to paper detected event by a paper detection sensor of or in communication with MFP 103 at operation 133, at operation 134 MFP 103 stops at a currently displayed slide of a sequence of slides responsive to such a detection event. MFP at operation 134 after stopping at a currently displayed slide may pause at such slide responsive to such a detection event for a preset duration, which may be a default setting or a setting set at operation 112. As long as a detection event persists as determined by firmware 102 at operation 124, such pause at a currently displayed slide may likewise persist until a preset duration is reached. If, however, such detection event does not persist until completion of such preset duration as determined at operation 124, then sequential display of slides, namely a next slide in a sequence, may resume at operation 125 of firmware 102.

Resuming at operation 125 may return MFP 103 to displaying a sequence of slides on a touch screen panel one slide at a time. In other words, after a detect event is removed as associated with detecting by a paper detection sensor, displaying of a sequence of slides may resume after pausing. This allows for stopping at another slide of such a sequence of slides, or stopping at the same slide on a subsequent iteration cycle, responsive to another detect event of a detection sensor. After stopping again, then there may be pausing at such other slide responsive to such other detection event.

If a detection event persists for a set or preset duration as determined at operation 124, then a copy job may execute with touchless execution at operation 136 responsive to persistence of such detection event by a paper detection sensor for a set duration during such pause. Once a copy job has completed at operation 136, a finished state 126 may be identified by firmware 102. In this example, such a finished state 126 may cause firmware 102 to resume at operation 125.

After resumption at operation 125, it may be determined at operation 135 whether cycling through a display sequence has timed out as previously described. Along those lines, operation 132 may include cycling through a sequence of slides on touch screen panel for multiple cycles thereof. Furthermore, timing out as determined at operation 135 may be after completing displaying of multiple cycles of a slide presentation one slide at a time.

Figures 1, 2:
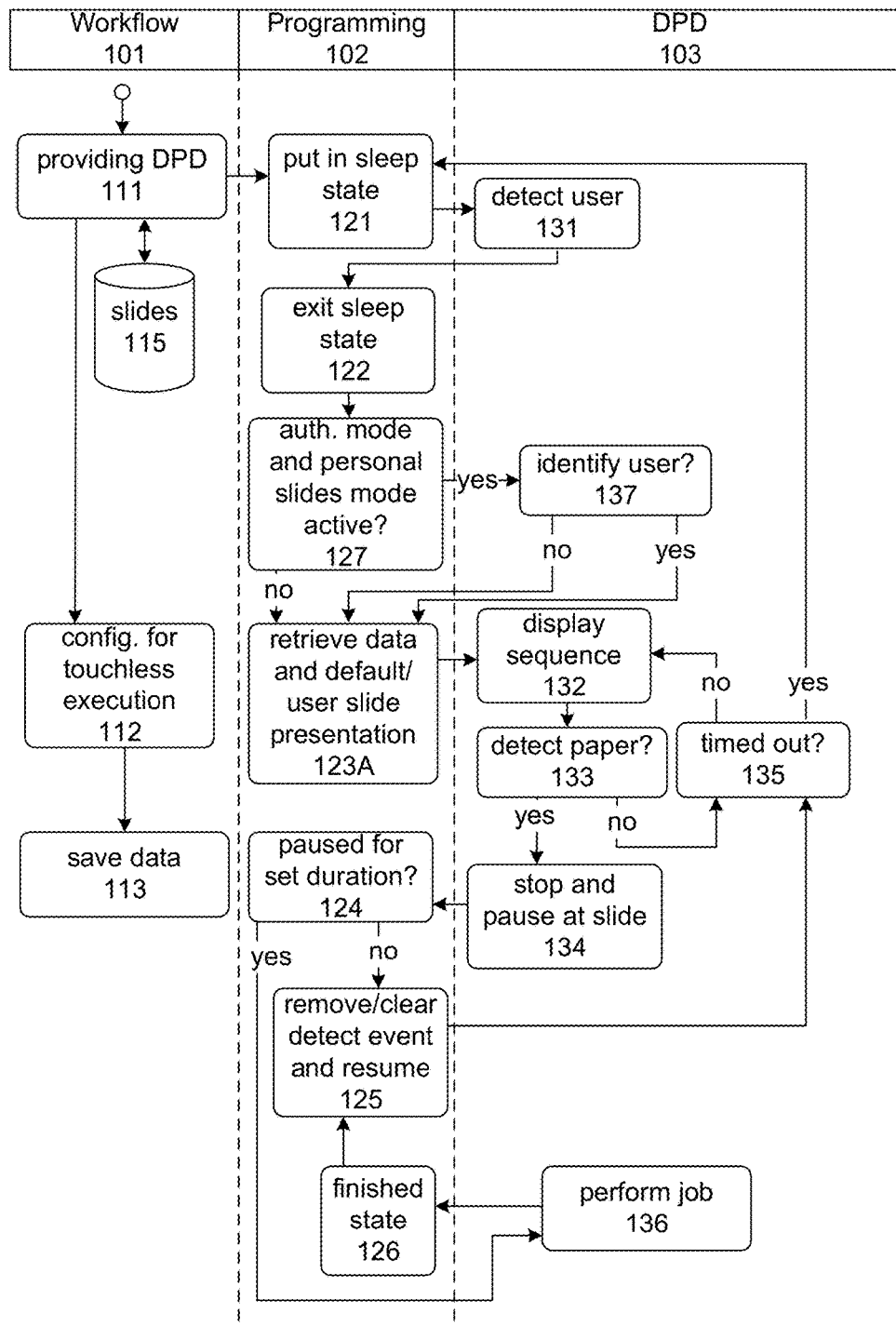
Figures 1, 2:
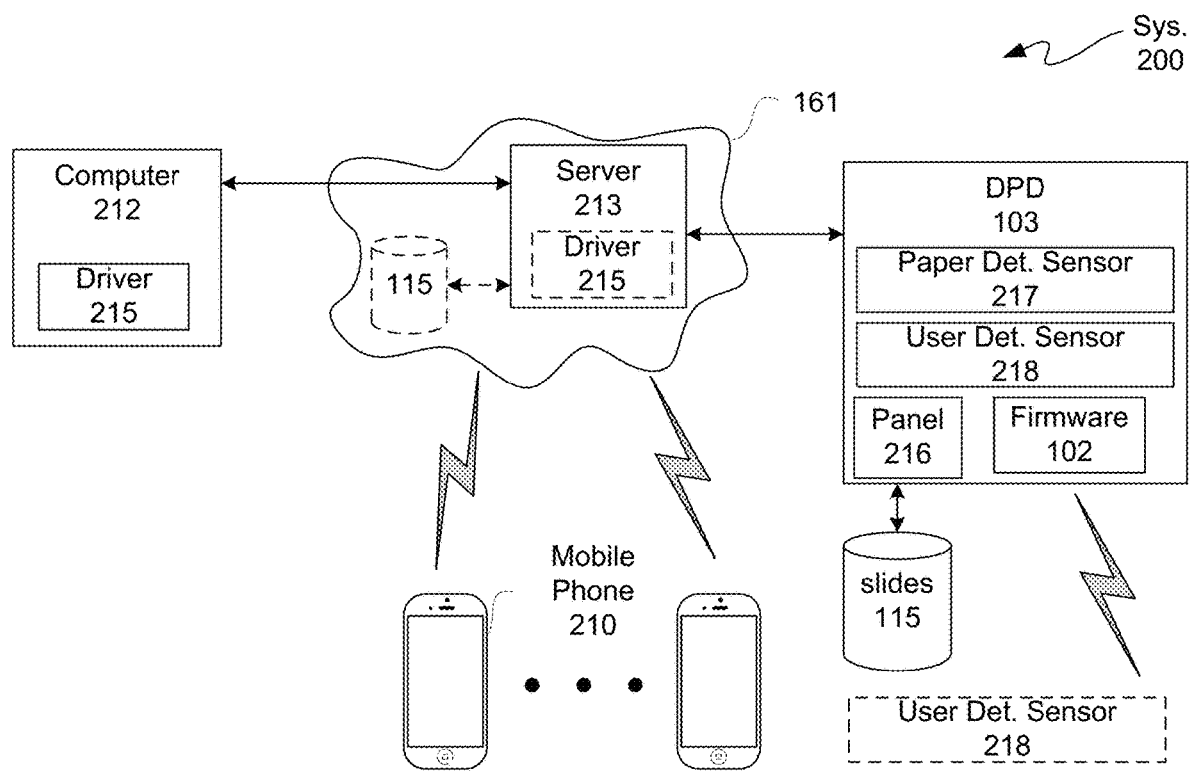
Figure 2:
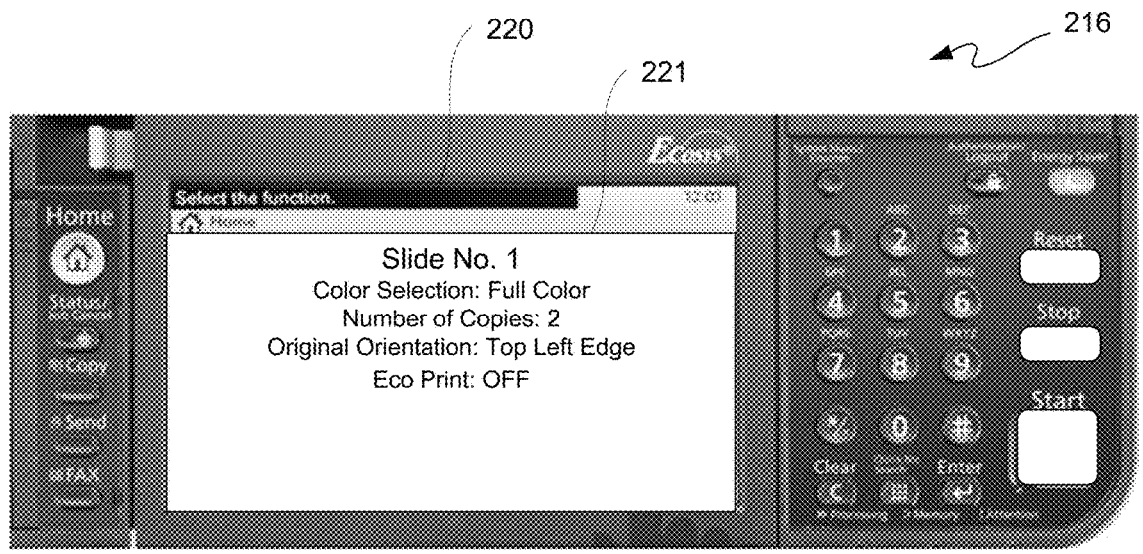

FIGS. 1-2 is a flow diagram depicting another example of a document processing system flow 110. Document processing system flow 100 of FIG. 1-1 is same or similar in many respect to document processing system flow 110 of FIG. 1-2, and so generally only differences are described below for purposes of clarity and not limitation.

After exiting a sleep state at operation 122, at operation 127 of firmware 102 a check as to whether an authorization mode and a personal slides mode are active may be made at operation 127. An authentication mode and a personal slides mode of firmware 102 for MFP 103 may be to authenticate a user in an authentication mode and then, after authentication, to allow a user to create or import their own slides. If both modes are active as determined at operation 127, then a user identity may be authenticated at operation 137.

If a user is authenticated at operation 137, then at operation 123A, data may be retrieved, such as data input at operation 112, as well as in this example a user slide presentation. A sequence of slides may be displayed on a touch screen panel at operation 132, where such slides and a sequence thereof is user-specific responsive to a particular user authenticated at operation 137.

If, however, at operation 127 either an authentication mode or a personal slides mode is determined not to be active, or if a user identity is not authenticated at operation 137, then at operation 123A configuration data may be retrieved along with a default slide presentation. Along those lines, displaying of a sequence of slides on a touch screen panel at operation 132 may be a default set of slides.

FIG. 2-1 is a block diagram depicting an example of a document processing system 200. Document processing system 200 may be used with document processing system flow 100 or 110 of FIG. 1-1 or 1-2, respectively.

In this example, a client computer ("client") 212 is in communication with a cloud network 161. Cloud network 161 may include a server computer ("server") 213. A DPD 103, such as an MFP 103, for example may be in communication with server 213. In this example, client 212 is a host computer having a driver 215 programmed therein for MFP 103. However, in another example, a driver 215 may be programmed in server 213.

In this example, one or more mobile devices, such as for example mobile phones 210, may be in wireless communication with server 213 via cloud network 161. For purposes of clarity by way of example and not limitation, it is assumed that client 212 is a host computer; however, in another example, a mobile phone 210 may be a host device for MFP 103.

Client 212 may be used for example at operation 112 of FIGS. 1-1 and 1-2 for inputting data, which may include slides of a slide presentation for a user-defined or personal slides mode. Along those lines, for identification of a user, a previously input set of slides by a user may be automatically displayed for such user responsive to identification of them.

Slides may be stored in storage 115. In this example, storage 115 is in direct communication, and may be internal to, MFP 103. However, optionally slides may be stored in storage 115 in communication with or of server 213.

In this example, MFP 103 includes a paper detect sensor 217, a user detect sensor 218, a touch screen or other display panel 216, and firmware 102. In this or another example, one or more wireless user detect sensors 218 external to MFP 103 may be in communication with MFP 103.

FIG. 2-2 is a pictorial diagram depicting an example of a panel 216. In this example, panel 216 has a display screen 220 for displaying a slide 221. Slide 221 is just an example of one version of a slide, and any of a variety of other versions of a slide may be displayed.

Figures 1, 3:
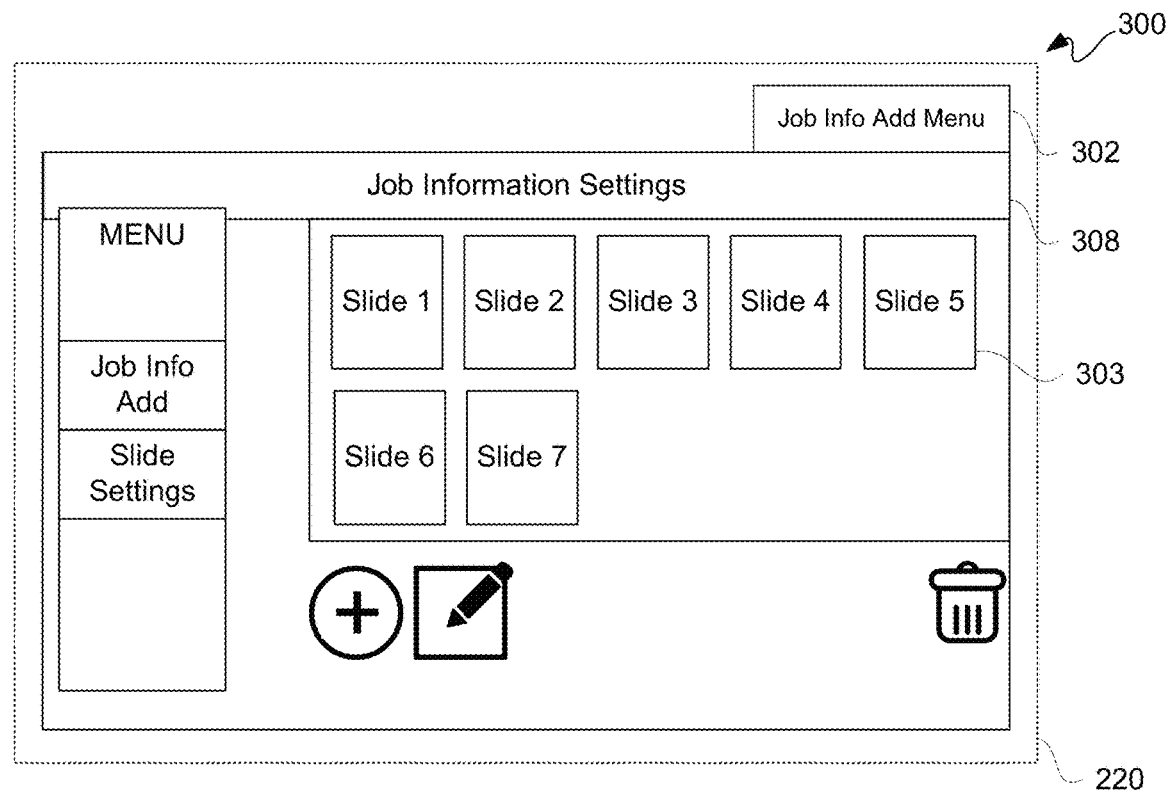
Figures 2, 3:
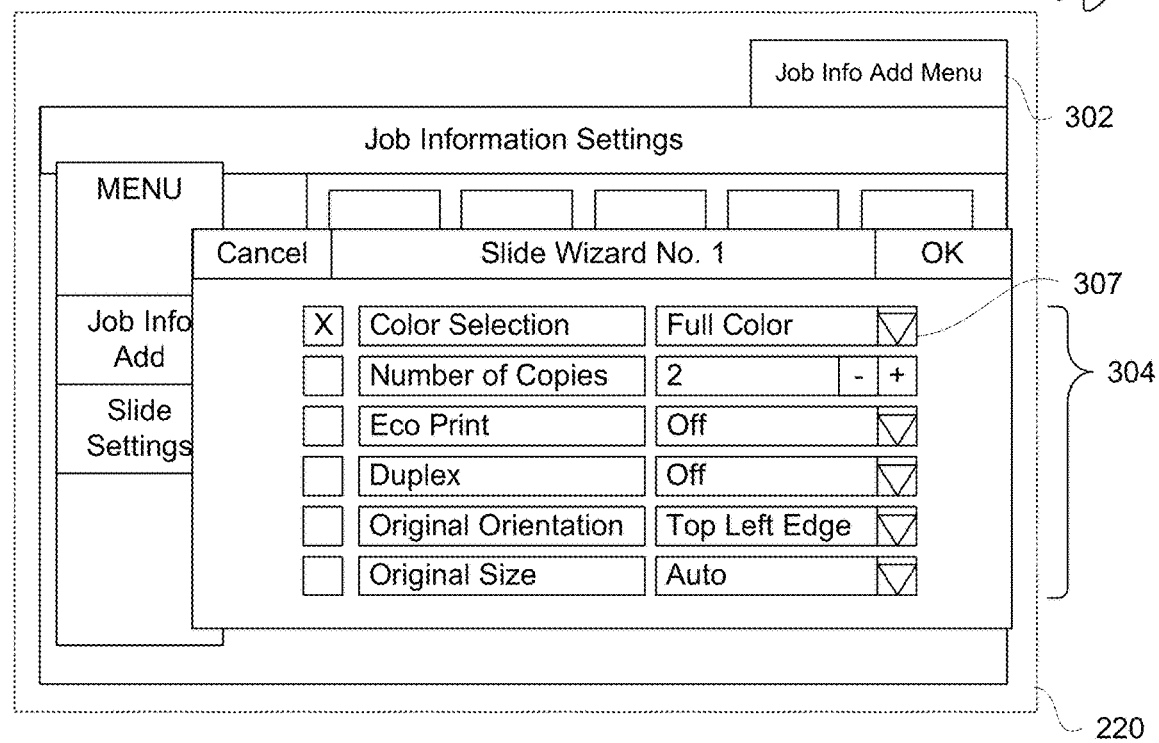
Figure 3:
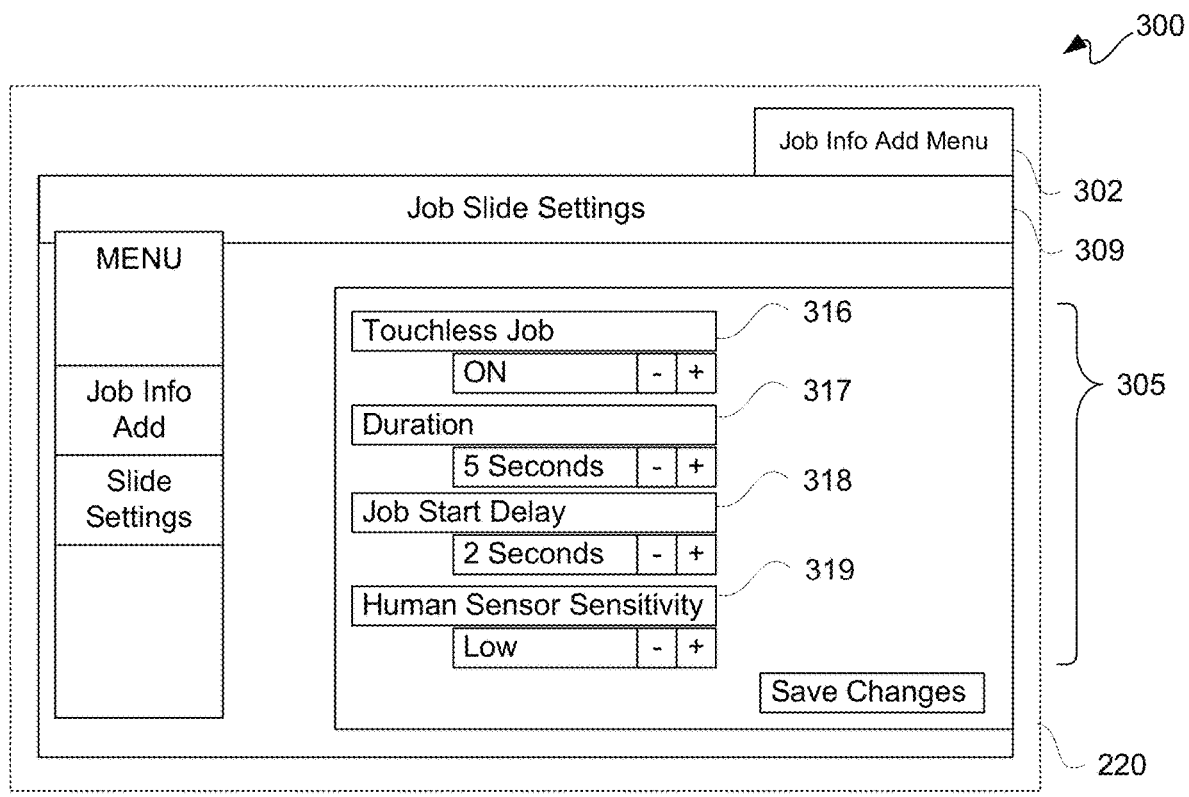

FIGS. 3-1 through 3-3 are respective pictorial diagrams depicting examples of screen displays of a user interface 300. With reference to FIG. 3-1 a screen display displayed on a display 220 may include a job information add menu tab 302, a job information settings heading 308, and one or more slide icons 303 corresponding to a slide presentation. In this example, seven slide icons 303 corresponding to slides 1 through 7 are illustratively depicted; however, in other examples fewer or more slides may be implemented.

With reference to FIG. 3-2, user interface 300 may include a pop-up screen 302. Pop-up screen 302 may appear in response to selection of a slide icon 303. In this example, a slide icon 303 for Slide 1 was selected; however, in another example another slide may be selected.

Pop-up screen 302 displayed on a display 220 may include a slide options menu or list 304 of items 307. In this example, items 307 include color selection, number of copies, eco print, duplex, original orientation, and original size. However, in another example of a list 304 one or more of these or one or more other items may appear.

With reference to FIG. 3-3, user interface 300 may include a job slide settings window or screen image 309 having a list 305 of items 316 through 319. In this example, a touchless job function 316, a duration of a pause setting 317, a job start delay setting 318, and a human sensor sensitivity setting 319 are in list 305; however, one or more of these or other items may appear in a list 305 in accordance with the description herein.

A touchless job function 316 may be toggled ON or OFF. If a touchless job function 316 is ON or active, then a duration of a pause setting 317 may be used to set how long a slide is displayed before transition to a next slide, assuming no paper or document detect event is asserted. A job start delay setting 318 may be used to set how long a paper or document detect event is continually asserted before starting a job, such as a copy job for example. A human sensor sensitivity setting 319 may be used for setting a sensitivity level for detection of a human for trigger a slide show display start. In this example, activation of human sensor sensitivity setting 319 automatically puts an MFP into a sleep mode after changes are saved. The example nonlimiting values for these various settings may be these or other values.

Figures 3, 4:
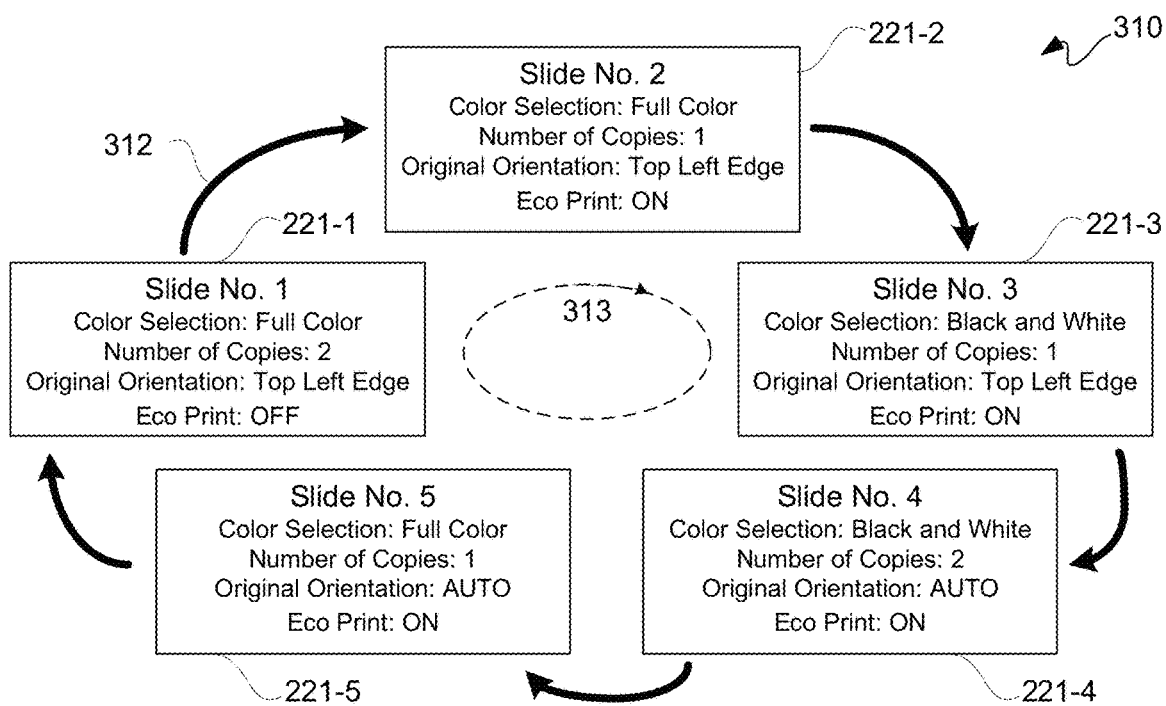
Figure 4:
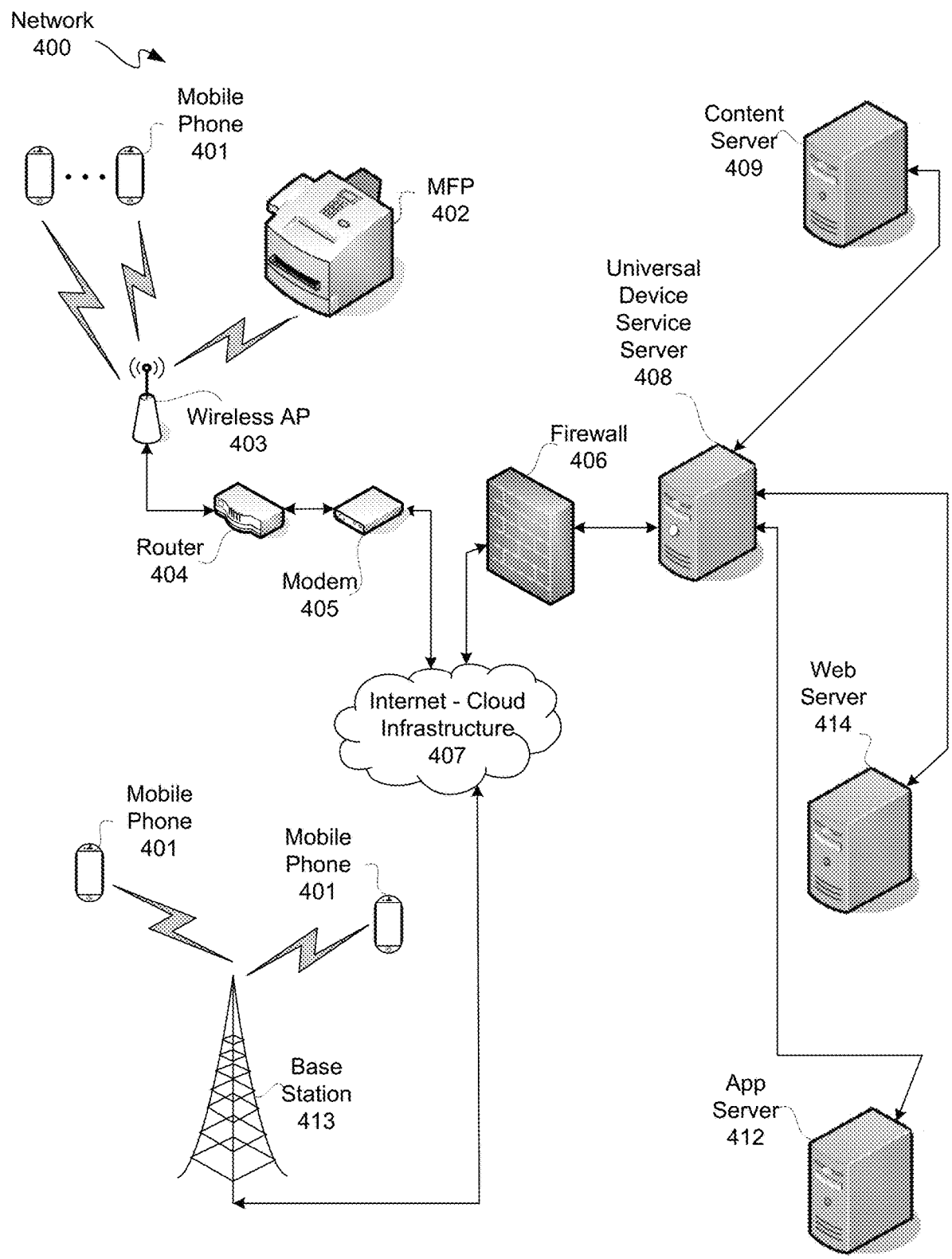

FIG. 3-4 is a block-flow diagram depicting examples of a sequence of slides 221-1 through 221-5 of a slide show 310. Slide show 310 may be displayed one slide at a time on a display panel 220, as previously described. Arrows 312 generally indicate transition from one slide to another for a cycle 313.

Because one or more of the examples described herein may be implemented in using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401, such as mobile phones, tablets, notebooks, and/or other such device, may be in wireless communication with a base station 413. Additionally, a desktop computer and/or a printing device, such as for example a multi-function printer ("MFP") 402, each of which may be web-usable devices, may be in wireless and/or wired communication to and from router 404.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
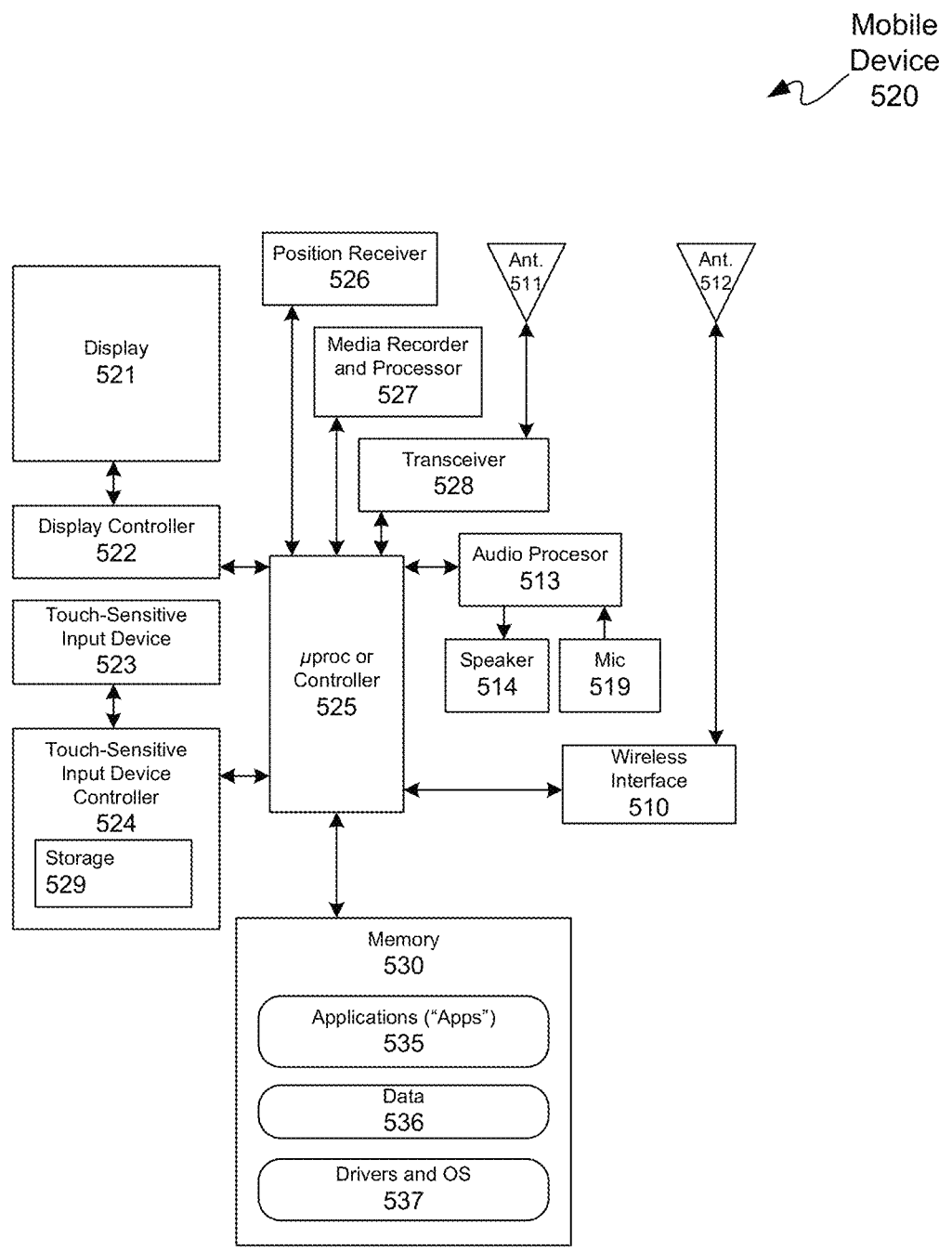
FIG. 5 is block diagram depicting an example of a portable communication device.

FIG. 5 is block diagram depicting an example of a portable communication device ("mobile device") 520. Mobile device 520 may be an example of a mobile device, as previously described.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder and processor 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
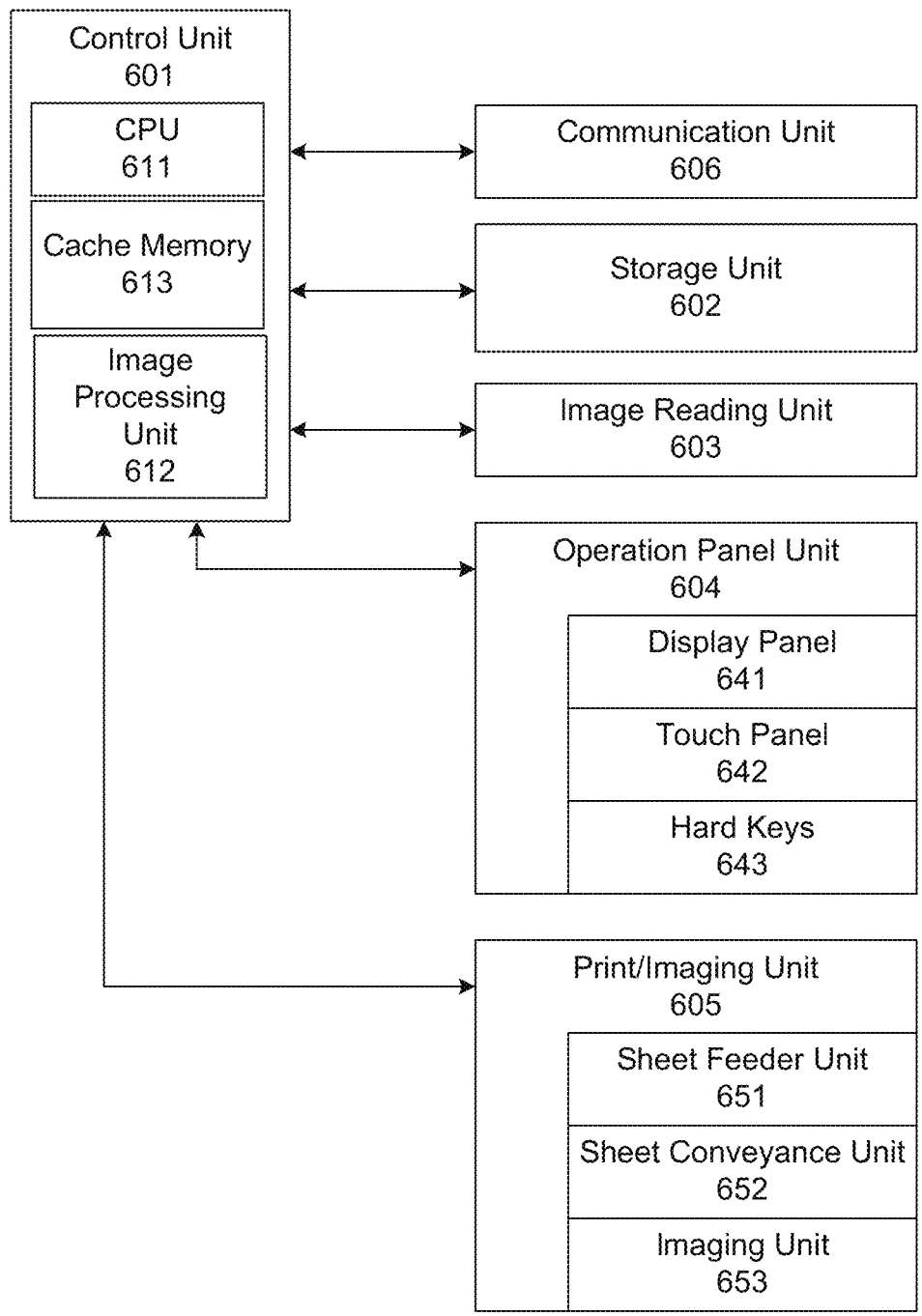
FIG. 6 is a block diagram depicting an example of a multi-function printer.

FIG. 6 is a block diagram depicting an example of an MFP 600. MFP 600 is provided for purposes of clarity by way of non-limiting example. MFP 600 is an example of an information processing system such as for handling a printer job as previously described. MFP 600 may be an example of an MFP 151 of FIG. 1-2.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation any printer resident printer driver components. A buffer queue may be located in cache memory 613 or storage unit 602. Storage unit 602 may store a GUI library or database.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
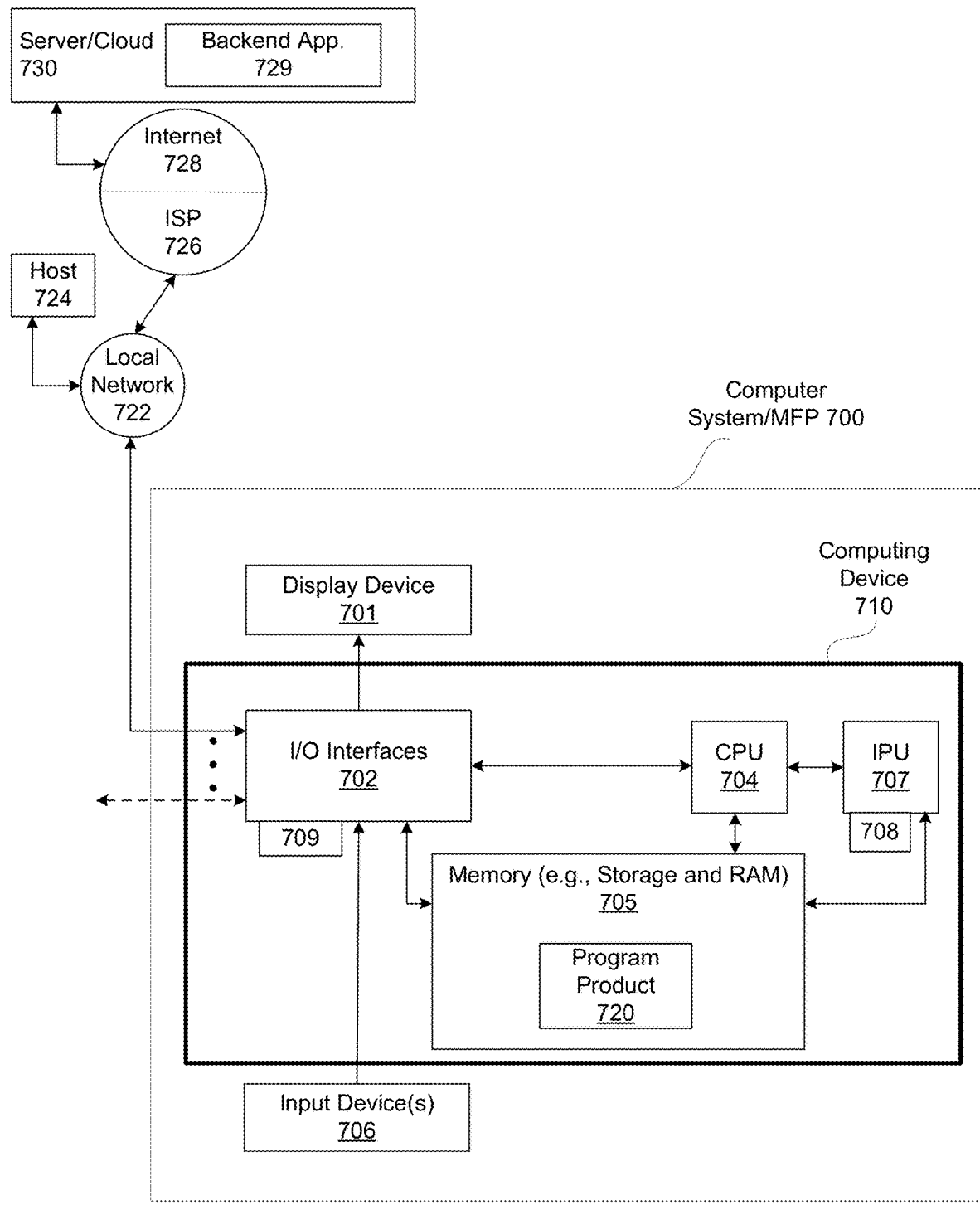
FIG. 7 is a block diagram depicting an example of a computer system.

FIG. 7 is a block diagram depicting an example of a computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 may be of an MFP. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application 729 for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
   providing a document processing device having a touch screen panel and configured for touchless execution of a job; and
   performing the job with the document processing device with the touchless execution comprising:
   accessing a slide presentation mode;
   displaying a sequence of slides on the touch screen panel in the slide presentation mode;
   detecting paper accessible by a detection sensor of the document processing device;
   stopping at a slide of the sequence of slides responsive to a detection event of the detection sensor;
   pausing at the slide responsive to the detection event; and
   executing the job with the touchless execution responsive to persistence of the detection event by the detection sensor for a set duration during the pause.

2. The method according to claim 1, further comprising: exiting a sleep state of the document processing device responsive to detection of a user by a user sensor of or in communication with the document processing device.

3. The method according to claim 2, wherein the user sensor is selected from a radio frequency identification reader, a Bluetooth sensor, or a near-field communication sensor.

4. The method according to claim 2, wherein the user sensor is selected from a motion detection sensor, a thermal detection sensor, or a visual image sensor.

5. The method according to claim 1, further comprising setting up in system and administrative settings programming of the document processing device via a host device in network communication with the document processing device for the touchless execution of the job.

6. The method according to claim 1, further comprising:
   cycling through the sequence of slides on the touch screen panel for multiple cycles thereof;
   timing out after completing the multiple cycles; and
   entering a sleep state of the document processing device.

7. The method according to claim 1, further comprising:
   after completion of execution of the copy job, entering a finished state by the document processing device; and
   returning the document processing device to the displaying of the sequence of slides on the touch screen panel.

8. The method according to claim 1, further comprising:
   activating an authentication mode of the document processing device;
   activating a personal slides mode of the document processing device; and
   wherein the displaying of the sequence of slides on the touch screen panel is user-specific responsive to the user.

9. The method according to claim 1, further comprising:
   removing the detect event associated with the detecting by the detection sensor;
   resuming the displaying of the sequence of slides after the pausing responsive to the removing of the detect event;
   stopping at another slide of the sequence of slides responsive to another detect event of the detection sensor; and
   pausing at the other slide responsive to the other detection event.

10. The method according to claim 9, wherein the document processing device is a multi-function printer.

11. A system, comprising:
    a document processing device having a touch screen panel and configured for touchless execution of a job; and
    the document processing device configured to perform the job with the touchless execution comprising:
    a slide presentation mode configured to access a sequence of slides for display thereof on the touch screen panel;
    a detection sensor configured to detect paper accessible by the document processing device; and
    the document processing device configured to stop at a slide of the sequence of slides responsive to a detection event of the detection sensor;

pause at the slide responsive to the detection event; and execute the job with the touchless execution responsive to persistence of the detection event by the detection sensor for a set duration during the pause.

12. The system according to claim 11, wherein the document processing device is configured to exit a sleep state responsive to detection of a user by a user sensor of or in communication with the document processing device.

13. The system according to claim 12, wherein:

the document processing device configured with an authentication mode and a personal slides mode;

the document processing device configured to select the sequence of slides for a user-specific sequence of slides therefor responsive to activation of both the authentication mode and the personal slides mode and identification of the user.

14. The system according to claim 13, wherein the user sensor is selected from a radio frequency identification reader, a Bluetooth sensor, or a near-field communication sensor.

15. The system according to claim 13, wherein the user sensor is a visual image sensor.

16. The system according to claim 14, wherein the document processing device is configured with system and administrative settings programming accessible via a host device in network communication with the document processing device for configuring the touchless execution.

17. The system according to claim 11, wherein the document processing device is configured to:

cycle through the sequence of slides on the touch screen panel for multiple cycles thereof;

time out after completing the multiple cycles; and enter a sleep state.

18. The system according to claim 11, wherein the document processing device is configured to:

enter a finished state after completion of execution of the copy job; and return to display of the sequence of slides on the touch screen panel.

19. The system according to claim 11, wherein the document processing device is configured to:

remove the detect event of the detection sensor;

resume the display of the sequence of slides after the pause responsive to removal of the detect event;

stop at another slide of the sequence of slides responsive to another detect event by the detection sensor; and pause at the other slide responsive to the other detection event.

20. The system according to claim 19, wherein the document processing device is a multi-function printer.

* * * * *